Nov. 14, 1961  G. H. WINBERRY, JR  3,008,360
CUTTING TOOL
Filed March 3, 1958
3 Sheets-Sheet 1
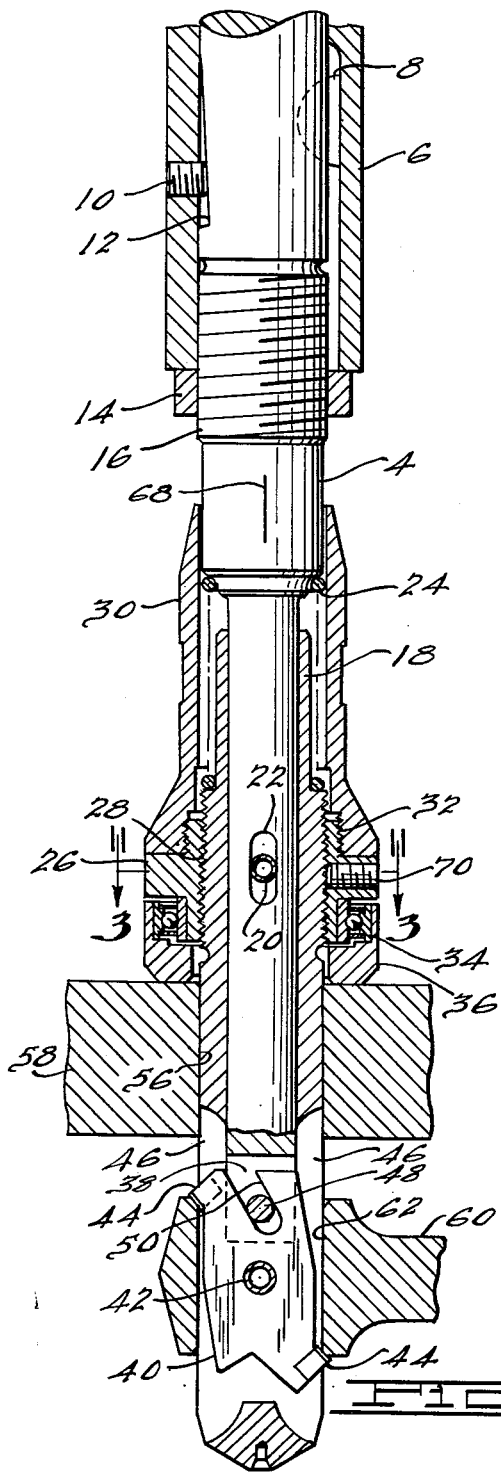
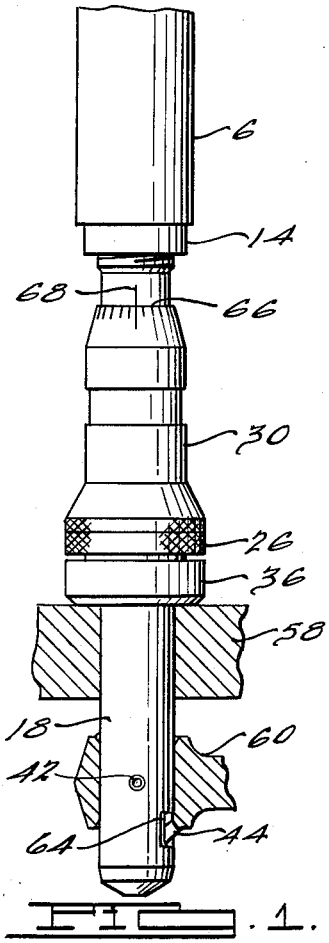
FIG. 1.
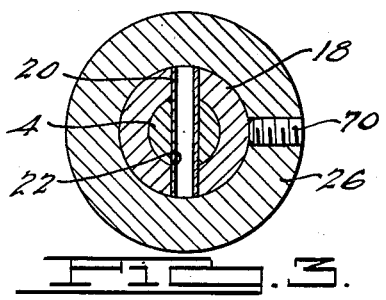
FIG. 3.
INVENTOR.
George H. Winberry, Jr.
BY
Harness, Dickey & Pierce
ATTORNEYS.

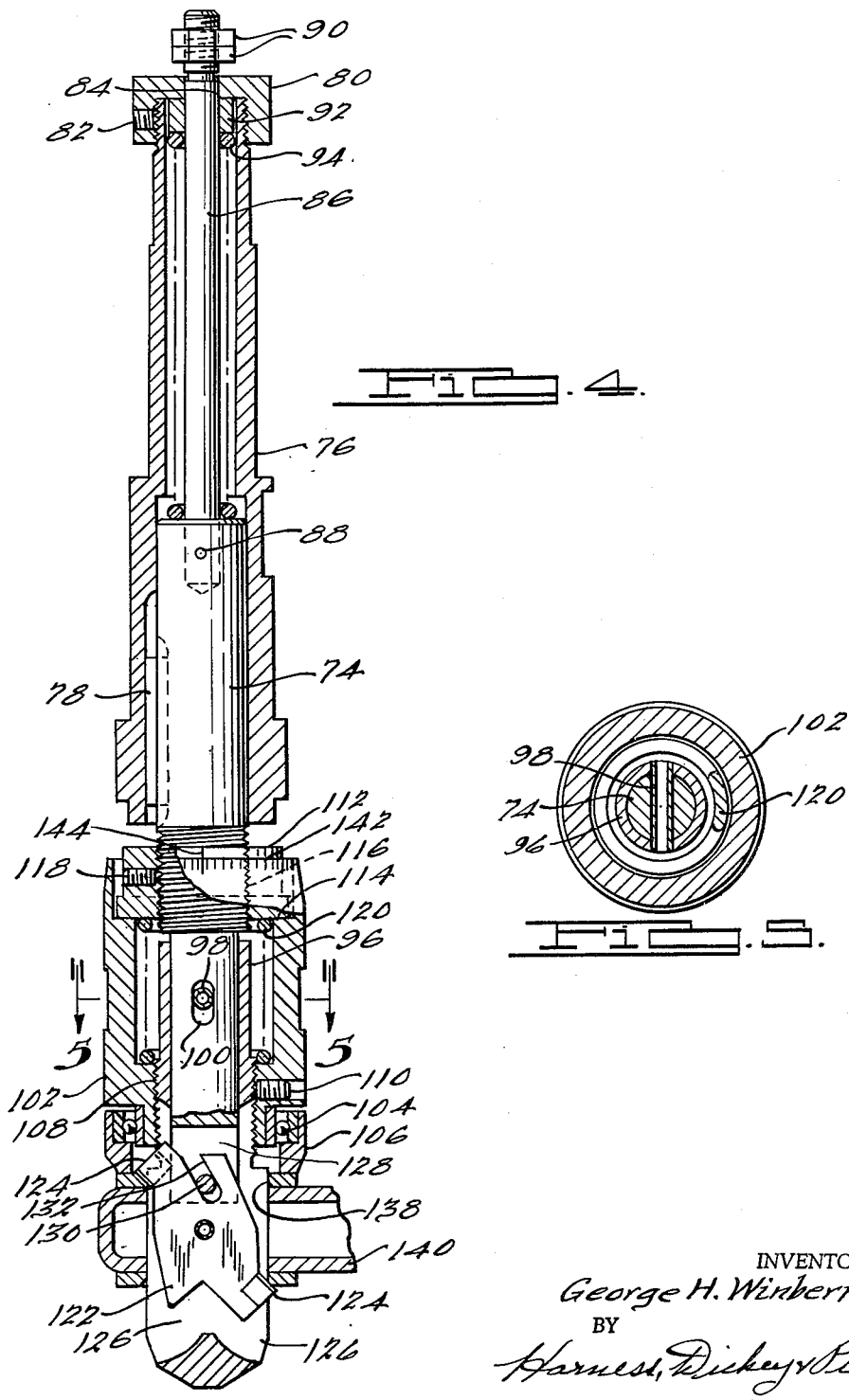

Nov. 14, 1961 G. H. WINBERRY, JR 3,008,360
CUTTING TOOL
Filed March 3, 1958
3 Sheets-Sheet 3
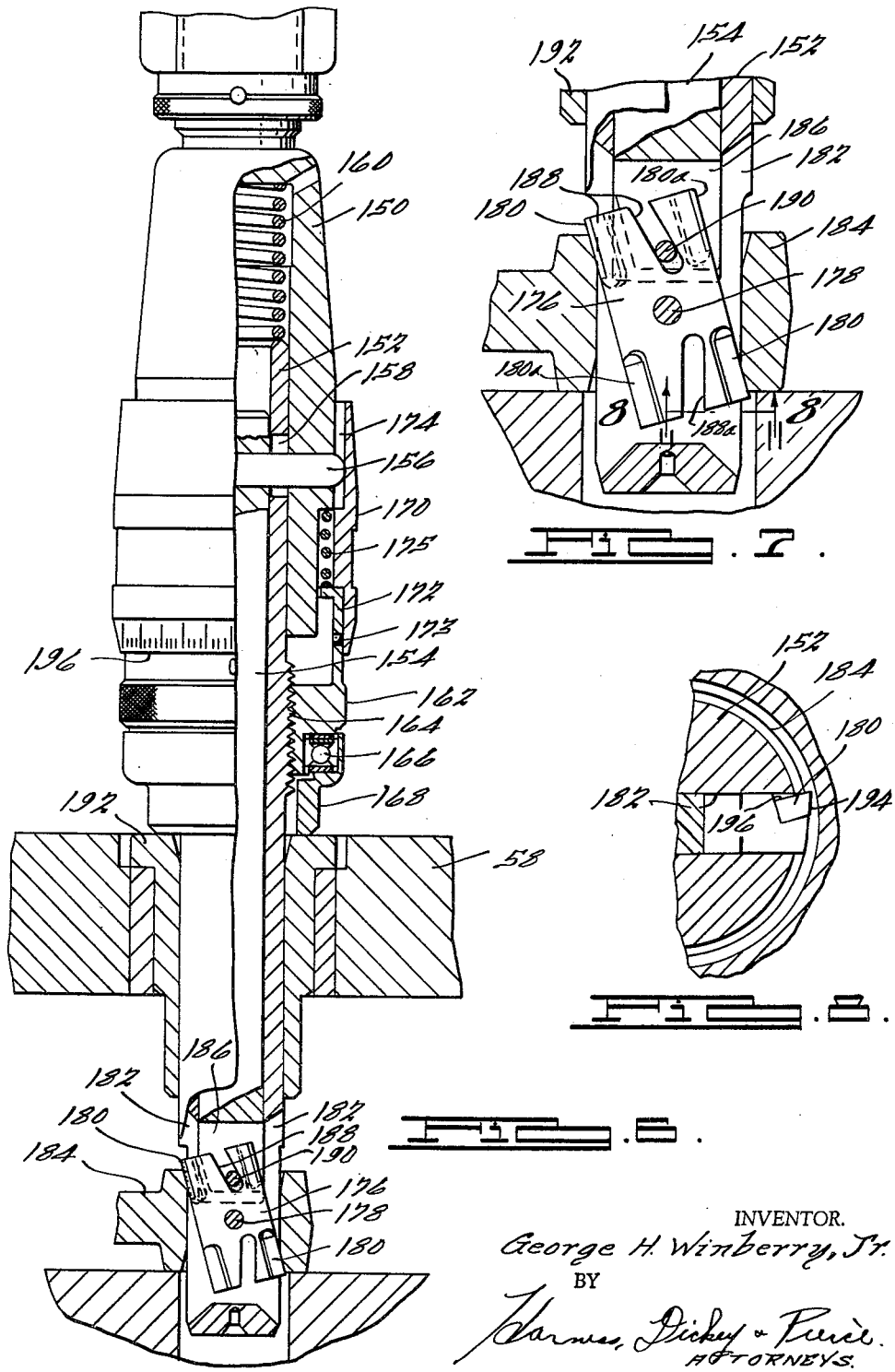
INVENTOR.
George H. Winberry, Jr.
BY
Harness, Dickey & Pierce
ATTORNEYS.

3,008,360
CUTTING TOOL

George H. Winberry, Jr., Detroit, Mich., assignor to Cogsdill Tool Products, Inc., Oak Park, Mich., a corporation of Michigan
Filed Mar. 3, 1958, Ser. No. 718,794
4 Claims. (Cl. 77—73.5)

This invention relates to cutting tools for chamfering the bores of workpieces, and more particularly to a cutting tool for simultaneously chamfering both ends of a bore in a workpiece.

The invention is comprised of a spindle having an adapter on the upper end thereof adapted to be fitted within a driving arbor, and a sleeve slidably keyed to the lower end of the spindle. A cutting blade having cutting teeth at opposite ends thereof is pivotally mounted within the lower portion of the sleeve and an adjustable stop collar is mounted on the upper portion of the sleeve for positioning the cutting blade relative to the workpiece. A light-duty spring is disposed between the spindle and the sleeve to urge them to a retracted position and a heavy-duty spring may be disposed between the spindle and the adapter to provide an override feature.

In operation, the cutting tool is rotatively driven and advanced by the arbor into the bore of a workpiece until the stop collar abuts against the upper surface of the workpiece or an intermediate stop, to position the cutting blade relative to the bore. Further advancement of the arbor advances the spindle relative to the sleeve to pivot the cutting blade into cutting engagement with both edges of the bore simultaneously. Still further advancement of the arbor is absorbed by the heavy-duty spring which permits the adapter to advance relative to the spindle.

It is one object of the invention to provide a cutting tool for simultaneously chamfering both ends of a bore in a workpiece.

It is another object of the invention to provide a pivoted cutting blade having cutting teeth at opposite ends thereof with a cam surface therebetween.

It is a further object of the invention to provide an override feature for a cutting tool for simultaneously chamfering both ends of a bore in a workpiece.

It is a still further object of the invention to provide a cutting tool for simultaneously chamfering both ends of a bore in a workpiece having means for adjusting the depth to be chamfered.

Other objects and features of novelty of the invention will be specifically pointed out or otherwise become apparent when referring, for a better understanding of the invention, to the following description taken in conjunction with the accompanying drawings, wherein:

FIGURE 1 is an elevational view of a cutting tool embodying features of the invention;

FIG. 2 is an enlarged sectional view of the cutting tool illustrated in FIG. 1;

FIG. 3 is a sectional view of the cutting tool illustrated in FIG. 2, taken along the line 3—3 thereof;

FIG. 4 is a sectional view in elevation of a cutting tool embodying other features of the invention;

FIG. 5 is a sectional view of the cutting tool illustrated in FIG. 4, taken along the line 5—5 thereof;

FIG. 6 is a broken elevational view of a cutting tool illustrating another form of the invention;

FIG. 7 is an enlarged view of the lower end of the cuting tool illustrated in FIG. 6; and FIG. 8 is a broken sectional view of the structure illustrated in FIG. 7, taken along the line 8—8 thereof.

Referring to FIGS. 1–3, a cutting tool embodying features of the invention is comprised of a spindle 4 having an adapter 6 slidably keyed to the upper end thereof by a woodruff key 8 and positioned longitudinally by a setscrew 10 bearing against a tapered portion 12 on the spindle 4. A thrust collar 14 is threaded on threads 16 of the spindle and abuts against the bottom of the adapter 6.

A sleeve 18 is slidably disposed over the lower end of the spindle 4 and is slidably keyed thereto by a pin 20 and an elongated slot 22 in the spindle 4. A spring 24 is disposed between a shoulder on the spindle 4 and an internal shoulder on the sleeve 18 to urge them to a retracted position wherein the pin 20 engages the bottom of the elongated slot 22. As illustrated in FIG. 2, the tool is in its cutting position which will be described hereinafter. An internally threaded stop collar 26 is threaded on external threads 28 of the sleeve 18 and a tubular body 30 is threaded to the upper end of the stop collar 26 by threads 32. A ball bearing 34 is press fit onto the lower end thereof and a rotary collar 36 is in turn press fit to the outer race of the ball bearing 34.

A cutting blade 40 is pivotally mounted within a slot 46 in the lower portion of the sleeve 18 by a pin 42 and has cutting teeth 44 mounted on opposite ends thereof. The lower end of the spindle 4 has a slot 38 therein that overlaps the cutting blade 40 and is connected thereto by a pin 48 passing through an angled slot 50 in the upper end of the cutting blade. As will be described in greater detail hereinafter, by providing the pin and angled slot connection the cutting blade can be positively pivoted into and out of cutting engagement by the longitudinal movement of the spindle 4 relative to the sleeve 18.

In operation, the lower portion of the sleeve is aligned with an aperture 56 in a stop block 58, and a bore 62 of a workpiece 60, in this case a connecting rod for an automobile, is aligned beneath the aperture 56. Of course, the tool would be in its retracted position wherein the spindle 4 is retracted a sufficient distance so that the cutting blade 40 is pivoted clockwise to a position entirely within the sleeve 18.

From this starting position, the rotating tool is fed downwardly through the aperture 56 and the bore 62 by the driving arbor until the rotary collar 36 abuts against the stop 58 to halt the downward movement of the sleeve 18. This positions the cutting blade 40 relative to the bore 62. The ball bearing 34 permits the rotary collar 36 to abut against the stop 58 without rotation while the sleeve 18 is rotated by the arbor. Further advancement of the arbor advances the spindle 4 relative to the sleeve 18 by compressing the spring 24 so that the pin 48 cams against the side of the slot 50 to pivot the cutting teeth 44 into cutting position as shown in FIG. 2.

When the chamfer operation is completed, the arbor retracts the spindle 4, and the sleeve 18 remains in the position shown in FIG. 2 due to the compression of the spring 24 until the bottom of the elongated slot 22 engages the pin 20. At this point, the cutting blade 40 is pivoted to a position entirely within the sleeve 18 and continued upward movement of the arbor withdraws the sleeve 18 from the workpiece.

Referring to FIG. 1, it will be observed that the sleeve 18 has a relieved portion 64 behind the lower cutting tooth 44 to prevent the clogging of cutting chips around the cutting teeth. With the relieved portion 64 as shown in FIG. 1 the cutting tool would, of course, rotate in a clockwise direction as viewed from beneath the workpiece 60. A similar relieved portion is provided behind the upper cutting tooth 44 for the same purpose.

FIG. 1 also illustrates a scale 66 on the top edge of the tubular body 30 which together with the line 68 on the spindle 4 provides a means for indicating the relative position of the body 30 and the collar 26 relative to the sleeve 18. After the tubular body 30 has been adjusted by rotating the stop collar 26, a setscrew 70, shown in FIG. 2, is tightened to lock the stop collar 26 in position.

The amount of relative movement between the spindle 4 and the sleeve 18 is determined by the length of stroke of the arbor, which is adjusted by means associated therewith, and the position of the thrust collar 14 on the spindle. Assuming, for example, that the machine is set for a six inch length of stroke and the rotary collar 36 is set by rotating stop collar 26 so that it will abuttingly engage the stop 58 after five-and-one-half inches of the stroke, one-half-of-an-inch stroke is available for advancing the spindle 4 relative to the sleeve 18. This in turn determines the final cutting position or amount that will be chamfered by the cutting teeth 44. If the length of stroke remains constant and the spindle 4 is advanced one quarter inch relative to the adapter 6 by turning the setscrew 10 slightly and turning the thrust collar 14 upwardly into abutting engagement with the bottom of the adapter 6, the rotary collar will engage the stop after five-and-one-quarter inches of the stroke have been expended and three-quarters-of-an-inch of the stroke is available for advancing the spindle 4 relative to the sleeve 18. In practice, the thrust collar 36 can be used as a coarse adjustment and the machine setting as a fine adjustment for determining the amount of chamfer.

Referring to FIGS. 4 and 5, a modification of a chamfer tool embodying other features of the invention is illustrated comprising a spindle 74 having an adapter 76 extending over the upper end thereof for fitting the spindle 74 to the arbor of a machine. The adapter 76 is slidably keyed to the spindle 74 by a key 78 and has a cap 80 thread onto the upper end thereof. The cap 80 is locked into position by a setscrew 82 and has an aperture 84 therein to permit a rod 86 to pass therethrough. One end of the rod 86 is secured to the upper end of the spindle 74 by a pin 88 and two nuts 90 are threaded to the upper end thereof to prevent the adapter 76 from sliding off. A bushing 92 is disposed beneath the cap 80 and a spring 94 is disposed between the bushing 92 and the top of the spindle 74 to maintain the spindle and adapter in extended position. As shown in FIG. 4, the adapted 76 is advanced relative to the spindle 74 in an overriding manner as will hereinafter be described in detail.

A sleeve 96 extends over the lower end of the spindle 74 and is slidably keyed thereto by a pin 98 passing through an elongated slot 100 in the spindle 74. This construction is more clearly illustrated in FIG. 5. An internally threaded tubular collar 102 having a roller bearing 104 and a rotary collar 106 press fit on the lower end thereof, threadably engages external threads 108 of the sleeve 96. A setscrew 110 is provided for locking the tubular collar 102 in position.

An internally threaded stop collar 112 is threadably mounted on the external threads 116 of the spindle 74 intermediate the bottom of the adapter 76 and an internal shoulder 114 on the upper end of the tubular collar 102. A setscrew 118 is provided for locking the stop collar 112 in position and a spring 120 is disposed between the underside of the stop collar 112 and a second internal shoulder 121 on the tubular collar 102 to urge the spindle 74 and sleeve 96 to an extended position.

A cutting tool 122 is pivotally mounted within the lower portion of the sleeve 96 in alignment with slots 126 and has cutting teeth 124 disposed on opposite ends thereof. A slot 128 is formed on the lower end of the spindle 74 and overlaps the upper end of the cutting blade 122 having an angled slot 132 formed therein. A pin 130 connects the spindle to the cutting blade to form the pin and slot connection previously described.

In operation, the adapter 76 is fitted within the arbor of a machine and the heavy-duty spring 94 urges the adapter and the spindle 74 apart so that the top of the cap 80 abuts against the bottom of the nut 90. The light-duty spring 120 urges the tubular collar 102 and the stop collar 112 apart until the pin 98 abuts against the bottom of the elongated slot 100. It will be observed that the position of the tool as shown in FIG. 4 is the cutting position whereas the relative position of the elements as just described is the retracted or starting position of the tool.

With the tool in the retracted position, the downward stroke of the driving arbor feeds the lower end of the spindle 74 into the bore 138 of the workpiece 140 until the rotary collar 106 abuts against the workpiece to halt the downward movement of the sleeve 96. As before, this positions the cutting blade 122 relative to the bore 138. Continued advancement of the driving arbor advances the spindle 74 relative to the adapter 96 and compresses the light-duty spring 120 until the stop collar 112 abuts against the internal shoulder 114. The relative movement between the spindle 74 and the sleeve 96 advances the pin 130 within the angled slot 132 of the cutting blade to pivot the cutting teeth 124 from their retracted position, wherein they are completely within the sleeve 96, to their cutting position as shown in FIG. 4.

The heavy-duty spring 94 has sufficient strength to overcome the light-duty spring 120 to advance the spindle 74 relative to the sleeve 96 until the stop collar 112 abuts against the internal shoulder 114. However, in the event that the machine is not properly set up and the arbor continues to advance, the spring 94 will compress to permit the adapter 76 to override on the spindle 74. As shown in FIG. 4, the adapter 76 has advanced relative to the spindle 74 an amount equal to the space between the lower nut 90 and the top of the cap 80.

A scale 142 is provided on the upper end of the tubular collar 102 which cooperates with a line 144 on the stop collar 112 to indicate the position of the collar 102 relative to the stop collar 112 and sleeve 96. One hundred divisions are provided on the scale 142 and threads 116 have ten threads per inch so that rotation of the collar 102 one division is equal to a longitudinal advancement of the collar 102 and sleeve 96 one-thousandths-of-an-inch. Of course, other numbers of divisions may be combined with other pitches on threads 116 to obtain any desired advancement of the collar 102 per division of rotation of the collar. The scale 46 of FIG. 1 functions in a similar manner as does the scale 142.

It will be observed that advancement of the collar 102 relative to the sleeve 96 provides a means for positioning the cutting blade 122 relative to the workpiece. It will also be observed that rotation of the stop collar 112 relative to the spindle 74 will adjust the depth of cut of the cutting teeth 124 by adjusting the relative longitudinal movement permissible between the spindle 74 and the sleeve 96 before the stop collar 112 abuts against the internal shoulder 114.

Referring to FIGS. 6 through 8, another form invention is illustrated wherein a shank 150 has the upper end thereof adapted to fit within a driving arbor, and a sleeve 152 is slidably disposed within the lower end thereof. An elongated camming member 154 is slidably disposed within the sleeve 152 and is keyed to the shank 150 by a pin 156.

The sleeve 152 has a longitudinal slot 158 therein through which the pin 156 passes so that the sleeve is keyed to the shank 150 and camming member 154 but is permitted to move longitudinally relative thereto a limited distance. A heavy-duty spring 160 is disposed between the upper end of the sleeve 152 and the shank 150 to normally urge the sleeve downwardly so that the upper end of the slot 158 engages the pin 156. (As illustrated in FIG. 6 the tool is in the cutting position as will be described in greater detail hereinafter.)

An adjustable collar 162 is threaded to the sleeve by a threaded portion 164 and a ball bearing 166 is press fit on the lower end thereof with a rotary stop collar 168 press fit on the ball bearing. A tubular body 170 extends over the cutting tool and has a collar 172 press fit in the lower end thereof. The collar 172 has a plurality of teeth 173 around the lower end thereof which are urged into engagement with a plurality of teeth on the upper end of the adjustable collar 162. The tubular body 170 has an axially extending slot 174 on the upper end thereof into which the pin 156 extends to slidably key the tubular body to the shank 150 so that the teeth 173 can releasably engage the teeth on the upper end of the adjustable collar 162 to lock it against rotation.

A cutting blade 176 is pivotally mounted within the lower end of the sleeve 152 by a pin 178 and has cutting edges 180 and 180a at the four corners thereof. The cutting blade is located in a slot 182 in the lower end of the sleeve and the cutting edges are employed to chamfer opposite ends of a bore of a workpiece 184 when the cutting blade is pivoted in a counterclockwise direction.

The lower end of the camming member 154 has a slot 186 therein into which the upper end of the cutting blade 176 extends. Angular slots 188 and 188a extend inwardly from the ends of the blades between the cutting areas at the corners. The slot 188 in the upper end of the cutting blade has a pin 190 extending therethrough, the pin being fixed to the camming member and movable therewith. When the camming member 154 is moved downwardly relative to the sleeve 152, the pin 190 moves downwardly in the upper slot 188 and causes the blade to revolve counterclockwise to move the cutting edges 180 on diagonal corners to move into engagement with the wall of the bore of a workpiece. When the cutting edges 180 become dulled the blade is reversed to have the slot 188a disposed over the pin 190 so that the sharp cutting edges 180a at diagonal corners engage the workpiece thereafter. This substantially increases the life of a blade and reduces the cost of the per piece operation.

The stop block 58 is provided as previously described and a hollow plug 192 is inserted therein to provide a guide for the sleeve 152. In this manner different size plugs 192 can be employed to accommodate the various size sleeves 152 that may be encountered without affecting the stop block 58.

In operation, the downward advancement of the driving arbor advances the entire cutting tool downwardly until the sleeve 152 is disposed within the bore of a workpiece 184 as illustrated in FIG. 6. When this position is reached, the rotary stop collar 168 abuts against the upper surface of the plug 192 to halt the downward advancement of the sleeve. Continued downward advancement of the driving arbor causes the shank 150 and camming member 154 to advance relative to the sleeve 152 which in turn causes the pin 190 to slide in the angled slot 188 and pivot the cutting blade into cutting engagement.

When the driving arbor retracts the shank 150 and camming member 154 it will be observed that the cutting blade will be positively pivoted in a clockwise direction by virtue of its pin and slot connection with the camming member, and the sleeve 152 remains stationary due to the compression of the heavy-duty spring 160 until the cutting blade is pivoted entirely within the lower end thereof. At this point, the pin 156 will again engage the upper end of the slot 158 and further retraction of the driving arbor will retract the sleeve and cutting blade from the workpiece 184.

By virtue of the pin and slot construction, the cutting blade is positively pivoted in both directions which provides a very desirable feature. Experience has proved that cutting chips and other particles often clog about the cutting tool in a manner that would prevent the pivoting of the cutting blade to a retracted position entirely within the sleeve if it were retracted by a spring, for example, rather than positively retracted as by the present invention.

As most clearly illustrated in FIG. 8, the cutting teeth 180 are relieved on their surfaces 194 and 196 to facilitate the cutting action, and consequently the cutting teeth are adapted to cut when rotated in a counterclockwise direction as viewed in FIG. 8.

To adjust the position of the cutting blade relative to the workpiece, the tubular body 170 is lifted against the action of the light-duty spring 175 so that the teeth 173 are disengaged to permit adjustable collar 162 to be rotated on the threaded portion 164. Rotation of the adjustable collar in either direction will move it up or down so that the point at which it contacts the plug 192 in the stop member 58 will be varied which in turn varies the position of the sleeve 152 and the cutting blade relative to the workpiece 184. This is similar to the manner in which the position of the cutting blades of the previous embodiments are varied.

A scale 196 is provided on the lower end of the tubular body 170 and a suitable zero line is provided on the adjustable collar 162 to indicate the position of the adjustable collar relative to the tubular body. As previously described, the increments of the scale may be correlated with the pitch of the threaded portion 164 so that rotation of the adjustable collar from tooth 173 to the next is equivalent to a longitudinal advancement or retraction of one-thousandth of an inch.

What is claimed is:

1. A cutting tool for simultaneously chamfering both ends of a bore of a workpiece comprising a shank having the upper end thereof adapted to fit within a driving arbor and a longitudinally extending bore opening on the lower end thereof, a sleeve slidably keyed within said shank bore and extending from the lower end of said shank, a cutting blade pivotally mounted within the lower end of said sleeve having diagonally disposed upper and lower cutting edges on the opposite sides thereof, a camming member slidably disposed within said sleeve and keyed to said shank, the lower end of said camming member being connected to the upper end of said cutting blade by a pin and slot connection, said slot being disposed at an acute angle relative to the longitudinal axis of the sleeve and camming member, and stop means on said sleeve at a point spaced axially above said cutting blade for positioning said cutting blade relative to said bore whereby further advancement of the camming member relative to the sleeve positively pivots the cutting blade into cutting position wherein one cutting edge chamfers one end of the bore and the other cutting edge chamfers the other end of the bore and retraction of the camming member relative to the sleeve positively pivots the cutting blade out of cutting position.

2. A cutting tool for simultaneously chamfering both ends of a bore of a workpiece comprising a shank having the upper end thereof adapted to fit within a driving arbor and a longitudinally extending bore opening on the lower end thereof, a sleeve slidably disposed within said shank bore and extending downwardly from the lower end of said shank, a cutting blade pivotally mounted within the lower end of said sleeve having diagonally disposed upper and lower cutting edges on the opposite sides thereof, a camming member slidably disposed within said sleeve, pin means for keying said sleeve and camming member to said shank for rotation therewith and for supporting said sleeve for limited longitudinal movement relative to said shank and camming member, spring means interposed between said shank and sleeve to resiliently urge the sleeve downwardly relative to the shank, the lower end of said camming member being connected to the upper end of said cutting blade by a pin and slot connection, and stop means on said sleeve at a point spaced axially above said cutting blade for positioning said cutting blade relative to said workpiece whereby further advancement of the camming member relative to the sleeve positively pivots the cutting blade into cutting position wherein one cutting edge chamfers one end of the bore and the other cutting edge chamfers the other end of the bore and retraction of the camming member relative to the sleeve positively pivots the cutting blade out of cutting position.

3. The invention as defined in claim 2 wherein said pin means comprises a transverse pin extending through said camming member, sleeve and shank, and said pin passes through a longitudinally extending slot in said sleeve to provide limited longitudinal movement of the sleeve relative to the camming member and shank.

4. The subject matter as claimed in claim 3 wherein said stop means comprises a collar adjustably mounted on said sleeve, a tubular body disposed over said shank and extending downwardly to engage said adjustable collar to releasably lock it in position, and wherein said one end of said transverse pin extends within a longitudinally extending slot in the wall of said tubular body to key the tubular body to the shank.

References Cited in the file of this patent

UNITED STATES PATENTS

| | | |
|---|---|---|
| 1,530,593 | Calkins | Mar. 24, 1925 |
| 2,710,549 | Cogsdill | June 14, 1955 |
| 2,716,360 | Cogsdill et al. | Aug. 30, 1955 |

FOREIGN PATENTS

| | | |
|---|---|---|
| 246,506 | Switzerland | Oct. 1, 1947 |